July 24, 1934.  R. GENENGER  1,967,613

LEERING GLASS SHEETS

Filed March 12, 1931

INVENTOR
RICHARD GENENGER
BY
ATTORNEY

Patented July 24, 1934

1,967,613

UNITED STATES PATENT OFFICE 1,967,613

LEERING GLASS SHEETS

Richard Genenger, Aachen-Forst, Germany, assignor, by mesne assignments, to The American Bicheroux Company, a corporation of Delaware Application March 12, 1931, Serial No. 522,054
In Germany April 7, 1928

4 Claims. (Cl. 49—3)

My invention herein disclosed relates to the manufacture and leering of glass sheets produced at a high speed of formation and moved forward during the cooling and annealing period at a speed slower than that of the rate of formation. For this purpose it comprises a high speed intermittent sheet forming machine and a roller conveyor receiving the sheets from the machine as formed and consisting of a series of sheet carrying rollers, some of which at least are driven at a peripheral speed less than that of sheet formation, which lower speed will be hereinafter termed the leering speed, together with a high speed sheet feeding mechanism consisting of rollers acting on the upper surface of the sheet and driven with a peripheral velocity higher than leering speed. It further consists in the construction, arrangement and combination of the several parts as will be hereinafter more fully described and claimed.

Referring to the accompanying drawing in which corresponding parts are designated by corresponding marks of reference Fig. 1 is a fragmentary vertical longitudinal view of a structure embodying my invention.

Figure 1:
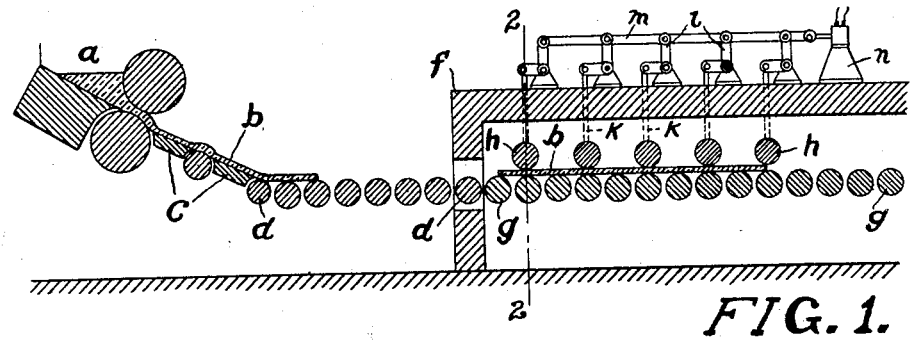
Figure 2:
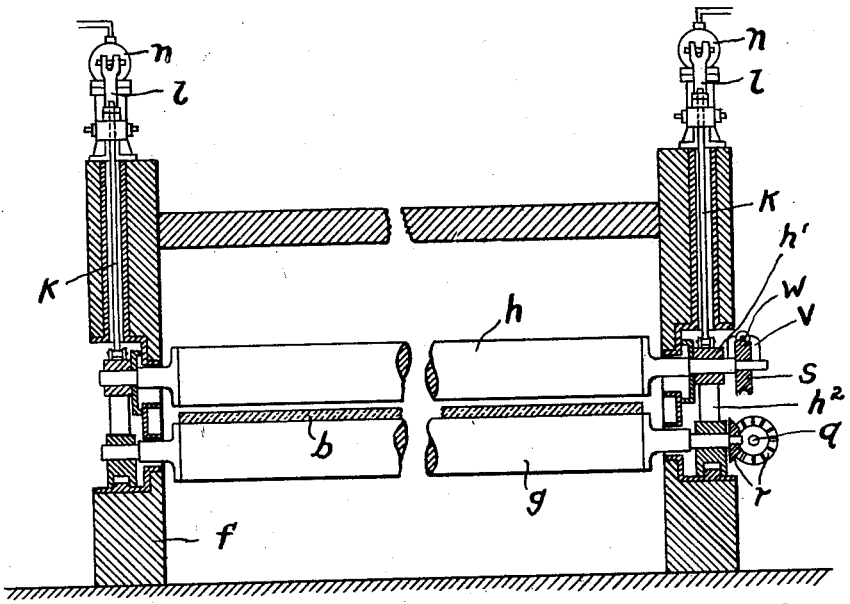
Fig. 2 is a vertical transverse section thereof taken through line 2—2 of Fig. 1.
Figure 3:
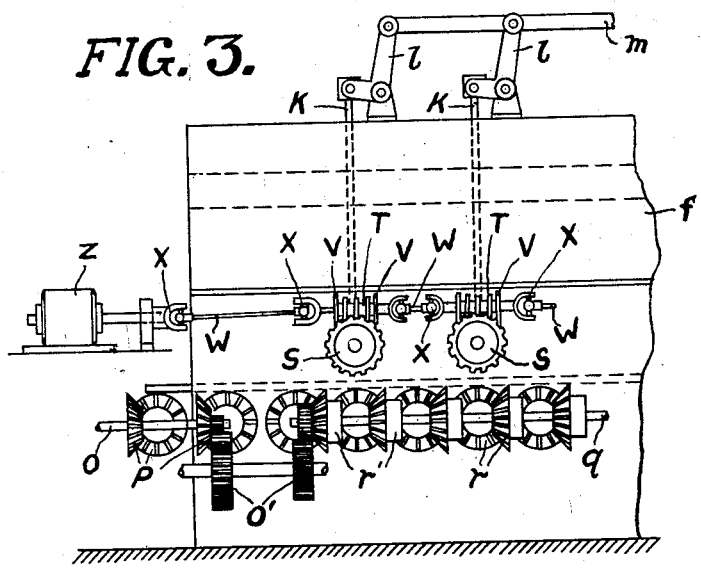
Fig. 3 is a fragmentary side elevation.

In the drawing $a$ is an intermittent forming machine, preferably of the Bicheroux type, adapted to fabricate, and to deliver down the incline apron $c$, sheets of glass $b$.

Located below the lower end of the apron is the sheet conveyor comprising the series of rollers $d$ and the series of rollers $g$. The rollers $d$ are driven with a peripheral speed the same as the speed at which the plate is delivered from the forming machine or slightly higher and the rollers $g$ are driven at a lower speed i. e. leering speed. These last named rollers may be enclosed in the leer $f$.

Located above certain of the rollers $g$ at the entrance end of the leer are rollers $h$ adapted to be driven at the same speed as the rollers $d$, i.e. at forming speed. The direction of the rotation of the rollers $h$ is contrary to that of the rollers $g$, and each roller $h$ is vertically above one of the rollers $g$.

The rollers $d$ are shown as driven from a shaft $o$ through the beveled gears $p$. The rollers $g$ are driven through the beveled gears $r$ by the longitudinal shaft $q$, an overrunning clutch $r'$ being interposed between the shaft and the rollers $g$ at the entrance end of the leer, to permit such latter rollers at times to be driven by the glass thereon. The shaft $q$ is shown as driven from the shaft $o$ by a speed reducing gearing $o'$.

The rollers $h$ have bearings in boxes $h'$ and are mounted for a limited vertical movement in guides $h^2$ and are at times lifted in such guides by the rods $k$ fastened at their upper ends to bell cranks $l$. The several bell cranks $l$ are connected together and may be rocked by the link $m$ when actuated by the magnet $n$.

The rollers $h$ are driven by the shaft $w$ having interposed along the link thereof worms $t$, connected with the shaft by universal joints $x$ and carried in bearings $v$ attached to the boxes $h'$ on the upper rollers $h$. The worms mesh with worm-wheels $s$ on the end of the rollers $h$ and the shaft $w$, driven at the desired speed by the motor $z$.

In the operation of the apparatus just described the sheet as it is delivered from the apron $c$ is received on the rollers $d$ and is moved forward thereon at speed of formation or at a slightly higher speed by which it is stretched as it leaves the apron. It is delivered by the rollers $d$ onto the rollers $g$ and under the rollers $h$ which are at this time raised to permit such delivery. After the sheet passes under the rollers $h$ the latter are lowered onto the top of the sheet and being driven at high speed feed the sheet forward at high speed on the rollers $g$, which at such time are driven by the sheet, this being permitted by the overrunning clutches. The sheet is fed forward at this speed by the rollers $h$ for a time sufficient to permit it to further harden, and after passing under the rollers $h$ it is carried forward at leering speed by the rollers $g$.

This application is a continuation in part of my prior application No. 352,487, filed in the United States Patent Office on April 4, 1929.

Having thus described my invention what I claim is:

1. In combination with a high speed intermittent sheet glass forming machine, of a conveyor receiving the sheet as the same is formed, the conveyor comprising two series of rollers, the rollers of the first series being driven with a peripheral speed substantially equal to the speed of sheet formation and the rollers of the second series being driven at a lower speed, and a series of rollers driven at a peripheral speed substantially equal to the speed of sheet formation, each roller of the last named series being located vertically above a conveyor roller of the second series.

2. In combination with a high speed intermittent sheet glass forming machine, of a conveyor receiving the sheet as the same is formed, the conveyor comprising two series of rollers, the rollers of the first series being driven with a peripheral speed substantially equal to the speed of sheet formation and the rollers of the second series being driven at a lower speed, an overrunning clutch interposed in the drive for the last named rollers, and a series of rollers driven at a peripheral speed substantially equal to the speed of sheet formation, each roller of the last named series being located vertically above a conveyor roller of the second series.

3. In combination with a high speed intermittent sheet glass forming machine, of a conveyor receiving the sheet as the same is formed, the conveyor comprising two series of rollers, the rollers of the first series being driven with a peripheral speed substantially equal to the speed of sheet formation and the rollers of the second series being driven at a lower speed, a series of rollers driven at a peripheral speed substantially equal to the speed of sheet formation, each roller of the last named series being located vertically above a conveyor roller of the second series, and means for raising and lowering the last named rollers.

4. In combination with a high speed intermittent sheet glass forming machine of a conveyor receiving the sheet as the same is formed, the conveyor comprising two series of rollers, the rollers of the first series being driven with a peripheral speed substantially equal to the speed of sheet formation and the rollers of the second series being driven at a lower speed, an overrunning clutch interposed in the drive for the last named rollers, a series of rollers driven at a peripheral speed substantially equal to the speed of sheet formation, each roller of the last named series being located vertically above a conveyor roller of the second series, and means for raising and lowering the last named rollers.

RICH. GENENGER.